United States Patent
Chan et al.

(10) Patent No.: US 11,673,558 B1
(45) Date of Patent: *Jun. 13, 2023

(54) APPARATUSES, SYSTEMS AND METHODS FOR IMPROVING OPERATION OF AUTONOMOUS VEHICLES

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,991

(22) Filed: Jan. 10, 2020

Related U.S. Application Data

(63) Continuation of application No. 15/875,548, filed on Jan. 19, 2018, now Pat. No. 10,549,759.

(60) Provisional application No. 62/448,040, filed on Jan. 19, 2017.

(51) Int. Cl.
| | |
|---|---|
| *B60W 40/08* | (2012.01) |
| *G05D 1/00* | (2006.01) |
| *B60W 50/12* | (2012.01) |
| *G06Q 10/02* | (2012.01) |
| *G06Q 50/30* | (2012.01) |
| *G06V 40/10* | (2022.01) |

(52) U.S. Cl.
CPC ............ *B60W 40/08* (2013.01); *B60W 50/12* (2013.01); *G05D 1/0061* (2013.01); *G05D 1/0088* (2013.01); *G06Q 10/02* (2013.01); *G06Q 50/30* (2013.01); *G06V 40/10* (2022.01); *B60W 2040/0836* (2013.01); *B60W 2040/0872* (2013.01)

(58) Field of Classification Search
CPC ................ B60W 40/08; B60W 50/12; B60W 2040/0872; B60W 2040/0836; G05D 1/0061; G05D 1/0088; G06Q 50/30; G06Q 10/02; G06K 9/00362
USPC ....................................................... 340/576
See application file for complete search history.

(56) References Cited

U.S. PATENT DOCUMENTS

| | | |
|---|---|---|
| 9,311,271 B2 | 4/2016 | Wright |
| 9,633,487 B2 | 4/2017 | Wright |
| 10,192,369 B2 | 1/2019 | Wright |

(Continued)

OTHER PUBLICATIONS

Non-Final Office Action for U.S. Appl. No. 15/875,548 dated Aug. 28, 2018.

(Continued)

*Primary Examiner* — Hirdepal Singh
(74) *Attorney, Agent, or Firm* — Marshall, Gerstein & Borun LLP

(57) ABSTRACT

Systems and methods for improving vehicular safety are provided. According to certain aspects, an electronic device may receive and analyze image data depicting an individual located within a vehicle. The electronic device may also access certain data related to a condition of the individual, and may accordingly determine whether the individual is fit to operate the vehicle. If the individual is unfit to operate the vehicle, the electronic device may alter autonomous operation of the vehicle.

22 Claims, 5 Drawing Sheets

(56) References Cited

U.S. PATENT DOCUMENTS

| | | | |
|---|---|---|---|
| 10,198,879 B2 | 2/2019 | Wright | |
| 2006/0267781 A1* | 11/2006 | Coulter | G01C 21/3679 |
| | | | 340/573.7 |
| 2014/0309813 A1* | 10/2014 | Ricci | G06F 21/32 |
| | | | 701/2 |
| 2017/0094455 A1* | 3/2017 | Beaurepaire | H04W 4/021 |
| 2017/0151959 A1* | 6/2017 | Boesen | A61B 5/6803 |
| 2017/0236210 A1* | 8/2017 | Kumar | G05D 1/0061 |
| | | | 705/4 |
| 2017/0300762 A1* | 10/2017 | Ishii | G06F 3/04883 |
| 2017/0316696 A1* | 11/2017 | Bartel | B60W 50/0098 |
| 2017/0355377 A1* | 12/2017 | Vijaya Kumar | B60W 50/0098 |
| 2018/0015825 A1* | 1/2018 | Nania | G08B 21/06 |
| 2018/0127001 A1 | 5/2018 | Ricci | |
| 2018/0136655 A1 | 5/2018 | Kim et al. | |
| 2018/0150074 A1 | 5/2018 | Hashimoto et al. | |
| 2018/0173230 A1* | 6/2018 | Goldman-Shenhar | |
| | | | B60W 50/08 |
| 2018/0178808 A1 | 6/2018 | Zhao et al. | |
| 2018/0197027 A1* | 7/2018 | Ali | F02D 41/042 |
| 2018/0201272 A1 | 7/2018 | Takeda | |
| 2019/0011918 A1 | 1/2019 | Son et al. | |
| 2019/0064805 A1 | 2/2019 | Frazzoli et al. | |

OTHER PUBLICATIONS

Final Office Action for U.S. Appl. No. 15/875,548 dated Dec. 20, 2018.

Non-Final Office Action for U.S. Appl. No. 15/875,548 dated May 8, 2019.

Notice of Allowance for U.S. Appl. No. 15/875,548 dated Oct. 1, 2019.

* cited by examiner

APPARATUSES, SYSTEMS AND METHODS FOR IMPROVING OPERATION OF AUTONOMOUS VEHICLES

CROSS REFERENCE TO RELATED APPLICATION

This application is a continuation of U.S. patent application Ser. No. 15/875,548, entitled APPARATUSES, SYSTEMS AND METHODS FOR IMPROVING OPERATION OF AUTONOMOUS VEHICLES, filed Jan. 19, 2018, the entire disclosure of which is hereby expressly incorporated herein by reference.

The present application is related to U.S. Patent Application Ser. No. 14/994,299, entitled APPARATUSES, SYSTEMS AND METHODS FOR ACQUIRING IMAGES OF OCCUPANTS INSIDE A VEHICLE, filed Jan. 13, 2016; Ser. No. 14/994,305, entitled APPARATUSES, SYSTEMS AND METHODS FOR CLASSIFYING DIGITAL IMAGES, filed Jan. 13, 2016; Ser. No. 14/994,308, entitled APPARATUSES, SYSTEMS AND METHODS FOR CLASSIFYING DIGITAL IMAGES, filed Jan. 13, 2016; Ser. No. 14/994,310, entitled APPARATUSES, SYSTEMS AND METHODS FOR COMPRESSING IMAGE DATA THAT IS REPRESENTATIVE OF A SERIES OF DIGITAL IMAGES, filed Jan. 13, 2016; Ser. No. 14/994,409, entitled APPARATUSES, SYSTEMS AND METHODS FOR DETERMINING DISTRACTIONS ASSOCIATED WITH VEHICLE DRIVING ROUTES, filed Jan. 13, 2016; Ser. No. 14/994,415, entitled APPARATUSES, SYSTEMS AND METHODS FOR GENERATING DATA REPRESENTATIVE OF VEHICLE DRIVER RATINGS, filed Jan. 13, 2016; Ser. No. 14/994,419, entitled APPARATUSES, SYSTEMS AND METHODS FOR GENERATING DATA REPRESENTATIVE OF VEHICLE OCCUPANT POSTURES, filed Jan. 13, 2016; Ser. No. 14/994,424, entitled APPARATUSES, SYSTEMS AND METHODS FOR TRANSITIONING BETWEEN AUTONOMOUS AND MANUAL MODES OF VEHICLE OPERATION, filed Jan. 13, 2016; Ser. No. 14/994,431, entitled APPARATUSES, SYSTEMS AND METHODS FOR DETERMINING WHETHER A VEHICLE IS BEING OPERATED IN AUTONOMOUS MODE OR MANUAL MODE, filed Jan. 13, 2016; Ser. No. 14/994,436, entitled APPARATUSES, SYSTEMS AND METHODS FOR DETERMINING VEHICLE OPERATOR DISTRACTIONS, filed Jan. 13, 2016; Ser. No. 14/994,440, entitled APPARATUSES, SYSTEMS AND METHODS FOR DETERMINING WHETHER A VEHICLE SYSTEM IS DISTRACTING TO A VEHICLE OPERATOR, filed Jan. 13, 2016; Ser. No. 14/862,949, entitled SYSTEMS AND METHODS FOR USING IMAGE DATA TO GENERATE VEHICLE OPERATION LOGS, filed Sep. 23, 2015; and Ser. No. 14/989,524, entitled SYSTEMS AND METHODS FOR ASSOCIATING VEHICLE OPERATORS WITH DRIVING MISSES INDICATED IN VEHICLE OPERATION DATA, filed Jan. 6, 2016; the disclosures of which are incorporated herein in their entireties by reference thereto.

TECHNICAL FIELD

The present disclosure is directed to apparatuses, systems and methods for improving operation of autonomous vehicles. More particularly, the present disclosure is directed to apparatuses, systems and methods for operating autonomous vehicles based on a state of an individual with the vehicle.

BACKGROUND

Individuals have been operating and traveling in vehicles as a means of transportation for decades. Generally, some individuals exercise more care or caution than do other individuals when operating vehicles. In particular, individuals may sometimes operate vehicles when they are unfit to do so, such as if the individuals are intoxicated or drowsy. This generally unsafe vehicle operation leads to accidents, injuries, or other negative effects.

Recently, vehicles have experienced an increased prevalence of electronic devices and sensors capable of sensing and generating data associated with vehicle operation. However, even with this increasing prevalence, there are no existing solutions for determining when specific drivers are operating vehicles in certain situations. For example, there is no existing solution for accurately determining when an individual is unfit to drive and, if the individual is unfit, for facilitating actions that may dissuade the individual from operating the vehicle.

Accordingly, there is an opportunity for systems and methods to leverage various data to identify individuals and determine information that may dissuade the individuals from operating vehicles.

SUMMARY

A computer-implemented method for improving operation of an autonomous vehicle may include receiving image data from at least one image sensor located within the vehicle, analyzing, by a computer processor, the image data to identify an individual located within the vehicle, accessing sensor data from a sensor associated with the vehicle, and analyzing the sensor data to determine a current state of the individual. The method may further include, in response to analyzing the sensor data, generating an autonomous operation mode control signal, and altering an autonomous operation mode of the vehicle based on the autonomous operation mode control signal.

In another embodiment, a system in an electronic device for improving operation of an autonomous vehicle may include a user interface, a memory configured to store non-transitory computer executable instructions, and a processor configured to interface with the memory. The processor may be configured to execute the non-transitory computer executable instructions to cause the processor to receive image data from at least one image sensor located within the vehicle, analyze the image data to identify an individual located within the vehicle, access sensor data from a sensor associated with the vehicle, and analyze the sensor data to determine a current state of the individual. The processor may be further configured to, in response to analyzing the sensor data, generate an autonomous operation mode control signal, and alter an autonomous operation mode of the vehicle based on the autonomous operation mode control signal.

In a further embodiment, a device for improving operation of an autonomous vehicle may include a user interface, a memory configured to store non-transitory computer executable instructions, and a processor configured to interface with the memory. The processor may be configured to execute the non-transitory computer executable instructions to cause the processor to receive image data from at least one image sensor located within the vehicle, analyze the image data to identify an individual located within the vehicle, access sensor data from a sensor associated with the vehicle, and analyze the sensor data to determine a current state of the individual. The processor may be further configured to, in response to analyzing the sensor data, generate an autonomous operation mode control signal, and alter an autonomous operation mode of the vehicle based on the autonomous operation mode control signal.

DETAILED DESCRIPTION

Figure 1A:
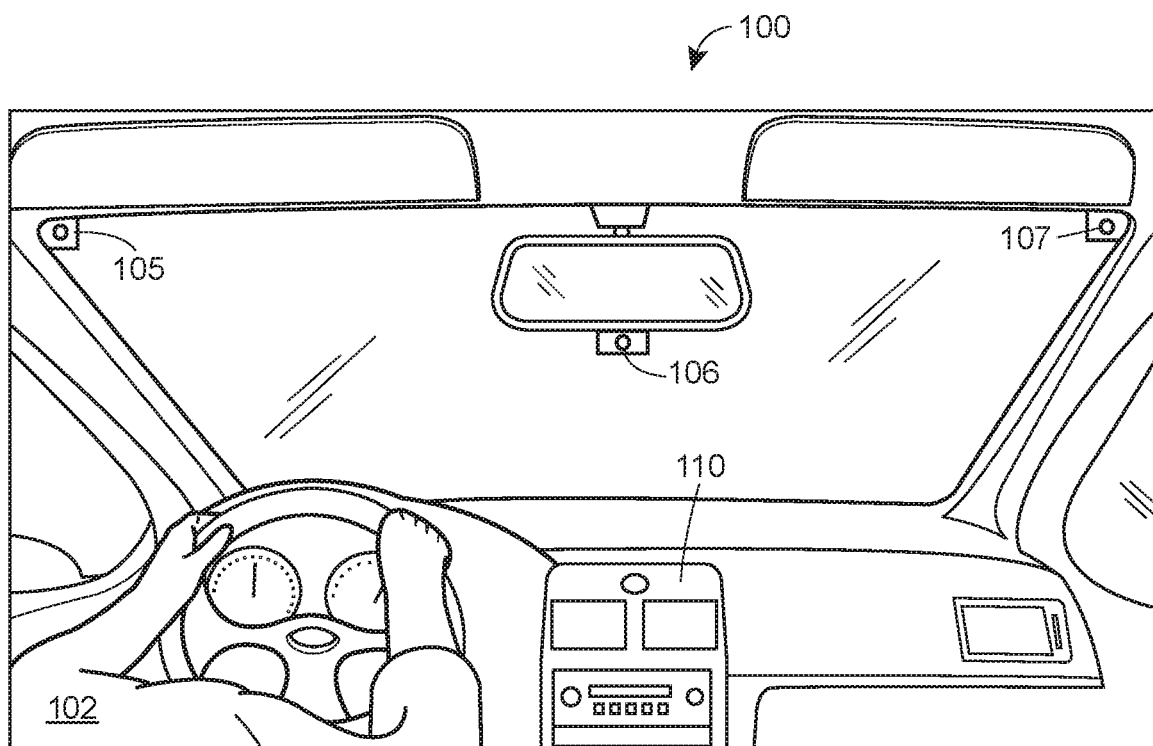
FIGS. 1A and 1B depict exemplary environments within a vehicle including various components configured to facilitate various functionalities, in accordance with some embodiments.

Apparatuses, systems and methods are provided for detecting, recording, compiling, and analyzing various vehicle data and environmental data related thereto. Existing vehicle operation environments support generation of various vehicle data and related information. However, there is no way to properly associate the vehicle data with the related information in a meaningful manner to enable the data to be effectively communicated to relevant individuals in an effort to, for example, safely operate autonomous vehicles. The present embodiments improve these shortcomings by effectively, efficiently, and automatically detecting and compiling relevant vehicle data and certain environmental data related thereto. Accordingly, associated memory, processing, and related data transmission requirements may be reduced compared to previous approaches.

According to certain aspects, a vehicle or an electronic device within the vehicle may be equipped with one or more image sensors. The image sensor(s) may be configured to capture image data of one or more individuals within the vehicle (e.g., an individual who is sitting in the driver's seat of a vehicle that is not currently operating, or a passenger of the vehicle), and transmit the captured image data to an electronic device. After receiving the image data, the electronic device may access stored user profile data that may include physical characteristics of a set of users. The electronic device may analyze the received image data by comparing the received image data to the stored user profile data to identify an individual depicted in the received image data, where the individual may be an operator, potential operator, or passenger of the vehicle. Additionally, the electronic device may analyze additional sensor data to determine a state of the individual, which may indicate whether the individual is unfit to operate the vehicle, such as if the individual is intoxicated or drowsy.

Further, the electronic device may further access, detect, or determine certain additional data that may be associated with an environment and/or configuration of the vehicle and/or the individual, including various sensor data gathered by one or more sensors of the vehicle, sensor data detected by one or more sensors of the electronic device, and/or other accessed or gathered data. The additional data may include or indicate a location of the electronic device, one or more contacts stored on the electronic device, location history of the electronic device, and/or the like. Additionally, the electronic device may interface with various local or remote components to retrieve certain additional data, such as available modes of transportation and/or nearby lodging availability. The electronic device may generate a notification that indicates at least some of the additional data, and may communicate the notification to the identified individual. The electronic device may enable the identified individual to view the notification and facilitate any action presented by the notification and/or another action.

The systems and methods therefore offer numerous benefits. In particular, the individual is afforded the benefit of automatically being presented with options that are alternative to operating a vehicle and that may dissuade the individual from operating the vehicle. Additionally, other individuals (as well as the individual him/herself) will not be exposed to a potentially hazardous situation, namely the potentially unfit individual operating the vehicle, when the individual chooses not to operate the vehicle. Further, an individual, entity, or the like may access any generated data (such as a vehicle operation log) for various purposes or applications. For example, an insurance provider may access the vehicle operation log and, based on the data included in the vehicle operation log, may determine a risk profile for the individual according to the state of the individual and any attempts to operate the vehicle. It should be appreciated that other benefits are envisioned.

The systems and methods discussed herein address a challenge that is particular to vehicle operation. In particular, the challenge relates to a difficulty in effectively dissuading individuals from operating vehicles when they are not in a proper state to operate the vehicles. This is particularly apparent with the increasing amount of vehicle sensors and types of data generated therefrom. In conventional environments, an individual's operation state may be determined by a sensor device (e.g., a breathalyzer) that detects the individual's blood alcohol content (BAC). In contrast, the systems and methods not only assess an individual's operation state, but the systems and methods also dynamically determine supplemental information associated with an environment of the vehicle or the individual, and communicate that information to the individual. Therefore, because the systems and methods employ the collection, compiling, analyzing, and storing of data associated with the vehicle and/or the individual, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored user profile data to identify individual(s) depicted in the image data, analyze sensor data to determine a state of the individual, determine environmental data associated with a device or the individual, and generate and communicate a notification that indicates the environmental data. This combination of elements further impose meaningful limits in that the operations are applied to improve vehicle data compiling by assessing and associating multiple types of distinct data in a meaningful and effective way.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data by comparing the captured image data to stored profile data. The electronic device may also receive or access sensor data, and analyze the sensor data, in real-time or near-real-time, and may automatically and dynamically generate and communicate a notification that indicates relevant environmental information. In this regard, the individual depicted in the image data is afforded the benefit of receiving an effective notification in real-time or near-real-time that serves to dissuade the individual from operating the vehicle.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100. In some scenarios, the individual 102 may sit in the driver's seat of the vehicle 100 but may not be operating the vehicle 100 (e.g., the engine of the vehicle 100 may not be on).

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. According to some embodiments, the set of sensors may also include a breathalyzer or similar type of device that may be configured to measure a BAC reading of the individual 102. It should be appreciated that additional sensors configured to detect a reading associated with a current state of the individual 102 are appreciated, including the image sensors 105, 106, 107. Further, in implementations, it should be appreciated that additional sensor devices that may be able to detect the same or alternate states of impairment (e.g., those caused by alcohol, marijuana, prescription drugs, controlled substances, energy products, etc.) are envisioned.

Figure 1B:
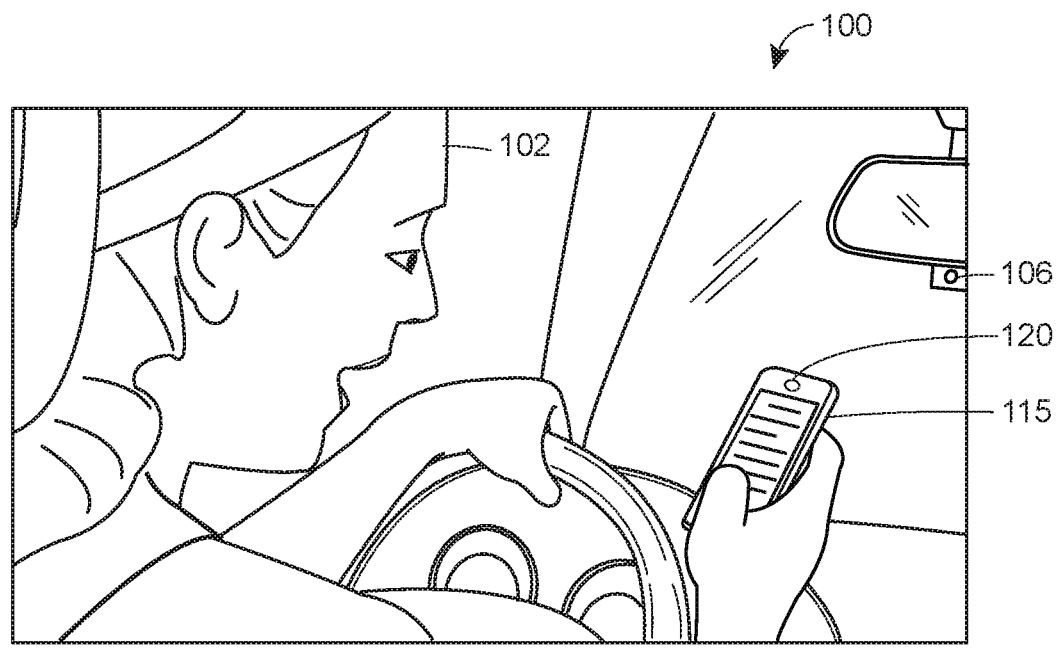

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle (or an individual who is attempting to or otherwise wanting to operate the vehicle). The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, a breathalyzer, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Further, the electronic devices 110, 115 may analyze the readings from a breathalyzer device and/or any supplemental image data to determine a current state of the individual 102 and, based on the current state, whether the individual 102 is fit to operate the vehicle 100.

The electronic devices 110, 115 may further interface with the various sensors or other components to assess various environmental data or information associated with the vehicle 100 and/or the individual 102. For example, the electronic devices 110, 115 may detect a current location via a location module (e.g., a GPS chip), a stored location history, any stored contacts, and/or other data. The electronic devices 110, 115 may additionally communicate with remote components via one or more network connections to retrieve additional information related to the environment of the vehicle 100 and/or the individual 102. In particular, the electronic devices 110, 115 may retrieve information related to lodging establishments, alternate modes of transportation, and/or other information that may relevant to persuading the individual 102 to not operate the vehicle 100.

The electronic devices 110, 115 may generate and display a notification that indicates relevant environmental information, such as the availability of a nearby lodging establishment, an alternate mode of transportation, a favorite or frequent contact of the individual 102, and/or other information. The individual 102 may interface with the electronic devices 110, 115 to view information, make selections, facilitate functionalities (e.g., booking a hotel or a taxi, or calling a friend), and/or take other action. In some implementations, the electronic devices 110, 115 may automatically facilitate certain functions without input from the individual 102. For example, the electronic devices 110, 115 may automatically book or reserve a hotel room or a taxi, or may place a call to a frequent contact of the individual 102.

The electronic devices 110, 115 may also generate a vehicle operation log that may indicate the identified individual, the determined state of the individual, any generated notifications and information related thereto, and/or any actions performed or facilitated, where the vehicle operation log may be later accessed and examined for various applications. The electronic devices 110, 115 may also provide, in real-time, near real-time, or at another time, the generated vehicle operation log to a third party entity or device (e.g., an insurance provider).

According to embodiments, an individual may manually access and examine the vehicle operation log, or a computing device may automatically access and examine the vehicle operation log, to facilitate the various applications. For example, an insurance provider may automatically analyze the vehicle operation log to assess any determined operating states for an individual, and may generate a vehicle insurance policy quote accordingly. Accordingly, the insurance provider may generate the vehicle insurance policy quote in real-time or near-real-time to when the electronic device 110, 115 generates the vehicle operation log. Further, the insurance provider may provide the vehicle insurance policy quote to the individual 102, such as when the individual 102 is still operating the vehicle or otherwise in real-time or near-real-time to generation of the vehicle operation log, where the individual 102 may select to purchase the vehicle insurance policy.

Figure 2:
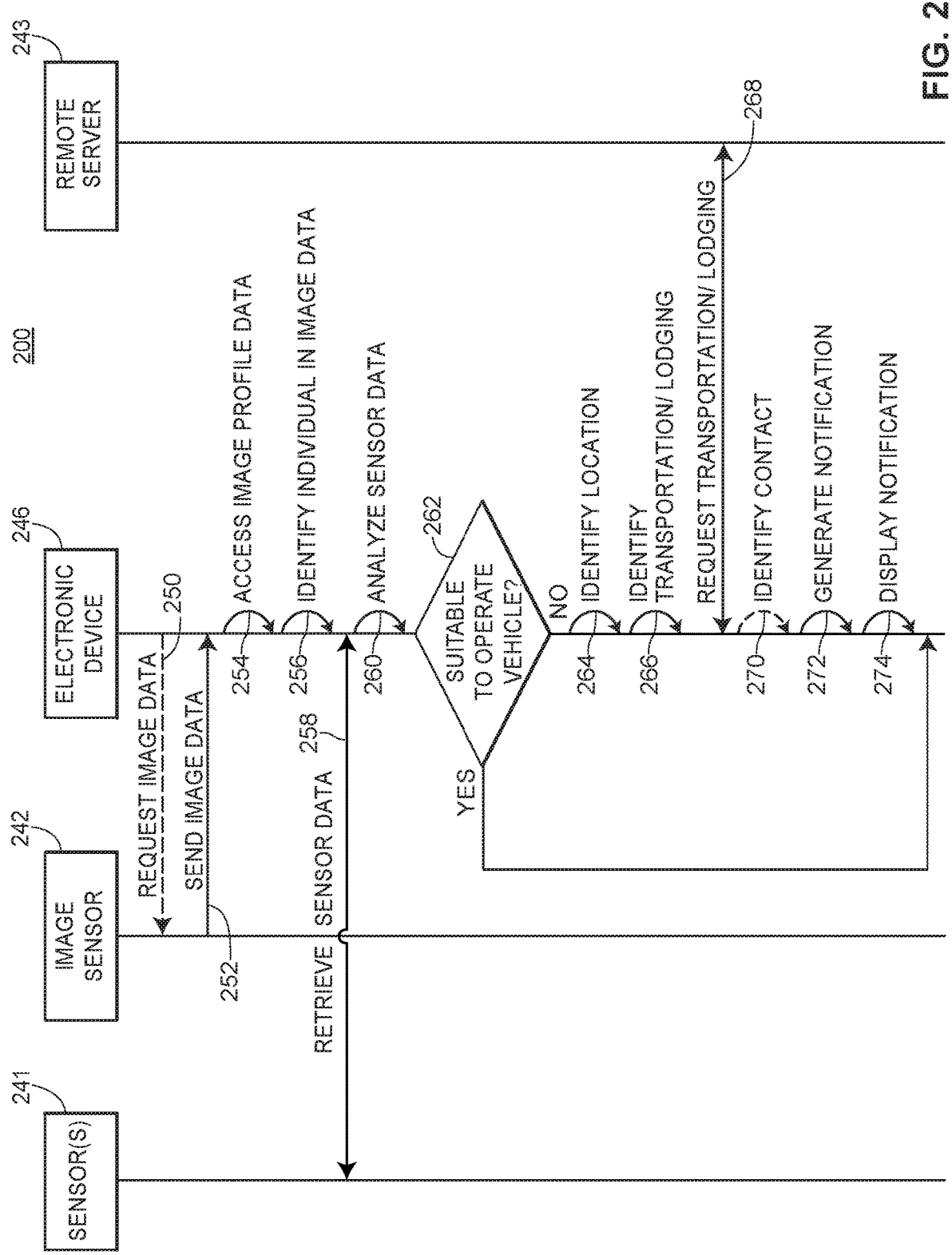
FIG. 2 depicts an exemplary signal diagram associated with analyzing data to identify individuals, assess a current state of the individuals, and perform various actions, in accordance with some embodiments.

FIG. 2 depicts a signal diagram 200 associated with facilitating certain functionalities associated with the systems and methods. The signal diagram 200 includes a set of components that may be associated with a vehicle: an image sensor 242 (such as one of the image sensors 105, 106, 107, 120 as discussed with respect to FIGS. 1A and 1B), an electronic device 246 (such as one of the electronic devices 110, 115 as discussed with respect to FIGS. 1A and 1B), one or more sensors 241, and a remote server 243. According to embodiments, one or both of the sensor(s) 241 or the image sensor 242 may be a component of (or separate from) the electronic device 246. Further, according to embodiments, the sensor(s) 241 may include a breathalyzer or similar device configured to detect a BAC reading for an individual (or other similar metric), as well as various motion sensors such as a gyroscope, accelerometer, and/or the like.

The signal diagram 200 may begin when the electronic device 246 optionally requests (250) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image (s), real-time video, image(s) and/or video recorded five minutes ago). It should be appreciated that the image sensor 242 may be internal to or external from the electronic device 246.

The image sensor 242 may send (252) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. In a further implementation, the image sensor 242 may send the image data in response to detecting that an individual has entered the vehicle, such as if the individual has sat down in the driver's seat of the vehicle. In this implementation, the image sensor 242 may be triggered by another sensor, such as a seat sensor. It should be appreciated that the image data may depict a vehicle operator or a passenger of the vehicle.

The electronic device 246 may access (254) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. In one implementation, the electronic device 246 may access the image profile data from the remote server 243. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (256) an individual depicted in the image data based on an analysis of the received image data and the accessed image profile data. According to the embodiments, the individual depicted in the image data may be the vehicle operator, a passenger of the vehicle, or an individual sitting in the driver's seat and wanting to operate the vehicle, where the electronic device 246 may discern whether the individual is the vehicle operator or a passenger based on a positioning of the individual as indicated in the image data. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may retrieve (258) sensor data from the sensor(s) 241. In one implementation, if the sensor 241 is a breathalyzer device (or a similar device), the electronic device 246 may retrieve BAC reading from the breathalyzer device. In another implementation, the sensor data may be in the form of additional image data (where the sensor 241 may be the image sensor 242) that indicates various facial characteristics of the vehicle operator. It should be appreciated that additional types of sensors that generate relevant data are appreciated.

The electronic device 246 may analyze (260) the sensor data using one or more various techniques, calculations, algorithms, or the like. Generally, the electronic device 246 may analyze the sensor data to determine whether the individual is in a condition suitable or fit to operate the vehicle. The electronic device 246 may deem the individual not suitable to operate the vehicle if the individual is intoxicated, drowsy, and/or in other similar states. In a particular implementation, if the sensor data includes a BAC reading, the electronic device 246 may deem the individual intoxicated if the BAC reading exceeds a threshold amount (e.g., 0.08%). In another implementation, if the sensor data includes image data depicting certain facial characteristics, the electronic device 246 may deem the individual intoxicated or drowsy if the facial characteristics are associated with the drowsiness, intoxication, and/or another similar condition (e.g., bloodshot eyes, droopy eyes, droopy mouth). It should be appreciated that other analyses, thresholds, and the like for determining a suitability to operate a vehicle are envisioned.

The electronic device 246 may generate an autonomous mode control signal based on a determined state of an individual within the vehicle. Furthermore, the electronic device 246 may alter an autonomous operation mode of the vehicle based on the autonomous mode vehicle. For example, the electronic device 246 may disable a manual operation mode of the vehicle, disable operation of the vehicle, automatically bring the vehicle to a stop in a safe location, etc.

Based on the analysis in (260), the electronic device 246 may determine (262) whether the individual is in a condition suitable to operate the vehicle. If the electronic device 246 determines that the individual is in a condition suitable to operate the vehicle ("YES"), processing may end or proceed to other functionality. If the electronic device 246 determines that the individual is not in a condition suitable to operate the vehicle ("NO"), the electronic device 246 may identify (264) a location. In particular, the electronic device 246 may interface with a location module (e.g., a GPS module) to identify its current location (e.g., its GPS coordinates), or may access stored location data that may indicate a recent location history of the electronic device 246. For example, the location history may indicate that the electronic device was recently present in a particular establishment or place of business (e.g., a restaurant, a bar, or the like).

Although not depicted in FIG. 2, the electronic device 246 may also identify a current time and may correlate the current time with the location information identified in (264) to identify a particular environment or circumstance of the electronic device 246 (and by extension, the individual). For example, the electronic device 246 may determine, based on the current time and stored location data, that the electronic device 246 (as well as the individual) was located in a bar five (5) minutes prior.

The electronic device 246 may identify (266) certain relevant or available transportation and/or lodging options. In particular, the transportation and/or lodging options may be accessible or located within a vicinity of the electronic device 246. In embodiments, a transportation option may be a taxi service, nearby public transportation (e.g., bus, train), a ride sharing service, a transportation network company, and/or the like. Further, in embodiments, the lodging option may be a hotel, a motel, an apartment, house, or room available for short-term rent, a hostel, and/or the like.

In some scenarios, the electronic device 246 may interface with the remote server 243, via a network(s), to request (268) availability for a particular mode of transportation or lodging. In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. In an implementation, the electronic device 246 may initiate an application that may facilitate an appropriate request. For example, the electronic device 246 may initiate a transportation network application that may request a nearby taxi or other type of vehicle. For further example, the electronic device 246 may initiate a booking application to inquire about an availability of a particular hotel. According to implementations, the electronic device 246 may automatically and in real-time facilitate the functionalities of (264), (266), and (268) in response to determining that the individual is not suitable to operate the vehicle.

The electronic device 246 may optionally identify (270) a contact that is stored on the electronic device 246 or otherwise accessible by the electronic device 246, where the contact has associated contact information (e.g., a phone number, social network information, or email address). In particular, the contact may be a recent contact (i.e., the individual has recently contacted the contact), or the contact may be a "favorite" or frequent contact of the individual.

The electronic device 246 may generate (272) a notification that may include information associated with an environment of the vehicle or the individual. According to embodiments, the information may indicate any identified available mode of transportation, available lodging, contact information of a contact, and/or other information that may be relevant to an option other than the individual operating the vehicle. The electronic device 246 may also display (274) the notification, such as in a user interface. In displaying the notification, the electronic device 246 may cause the user interface to display a pop-up notification that includes the notification and the relevant information. In some embodiments, the electronic device 246 may initiate a dedicated application configured to display the notification.

In further embodiments, the electronic device 246 may enable the individual to select to secure or book the identified alternate transportation or lodging, or to select to initiate a communication to the contact identified in (270). For example, the individual may use the electronic device 246 to select to request a taxi, where the electronic device 246 may indicate the requested taxi in the user interface. For further example, the electronic device 246 may enable the vehicle operator to book a room at an identified hotel. It should be appreciated that alternative techniques for securing or booking the identified transportation or lodging are envisioned. In some implementations, the electronic device 246 may automatically facilitate securing or booking the alternate transportation or lodging; or may automatically send a communication to the contact identified in (270), such as in response to determining that the individual is not in a condition suitable to operate the vehicle.

Although not depicted in FIG. 2, it should be appreciated that the electronic device 246 may record any recorded or determined information in the form of a vehicle operator log or similar record that the electronic device 246 may update with new information. In particular, the vehicle operation log may include an identification of the individual, any determined state of the individual, a current time and/or a current date, a location of the vehicle, and/or any other information. The electronic device 246 may send the vehicle operator log to the remote server 243, such as via any type of network connection. Accordingly, a user or administrator associated with the remote server 243 may review the vehicle operator log and facilitate any related functionalities.

It should be appreciated that additional functionalities associated with the systems and methods are envisioned. In embodiments, the electronic device 246 may determine (e.g., via updated image data) that the vehicle is not being operated by the originally-identified individual (i.e., the impaired individual) for a time period after the electronic device 246 determines that the originally-identified individual is not suitable to operate the vehicle, and specifically after the notification is displayed. In other words, the electronic device 246 may determine that the vehicle has a new operator, which may indicate that displaying the notification was effective.

The electronic device 246 may also collect and store vehicle operation data after displaying the notification, and may transmit the vehicle operation data to the remote server 243. Additionally, the electronic device 246 may collect and store information associated with any lodging and/or transportation options that the individual selects or books (e.g., hotels checked into, cab rides taken), which the electronic device 246 may also transmit to the remote server 243.

The remote server 243 may compile, store, and/or analyze any information received from the electronic device 246. In this regard, the remote server 243 may document a detection of operator impairment, that a notification was issued to the operator, any potential transportation and/or lodging options presented to the operator, any mitigation actions (e.g., a vehicle operator switch), any transportation and/or lodging selections, and/or other information. The remote server 243 may also determine or document the risks associated with each choice or potential choice (e.g., operating the vehicle while in an impaired state, finding alternative transportation or lodging), and the differences thereof. In some embodiments, such as if the remote server 243 represents an insurance provider, the remote server 243 may log the events, potential choices, selected choices, and risks associated with each potential choice or selected choice, and may user the information for insurance rating functionality.

Figure 3:
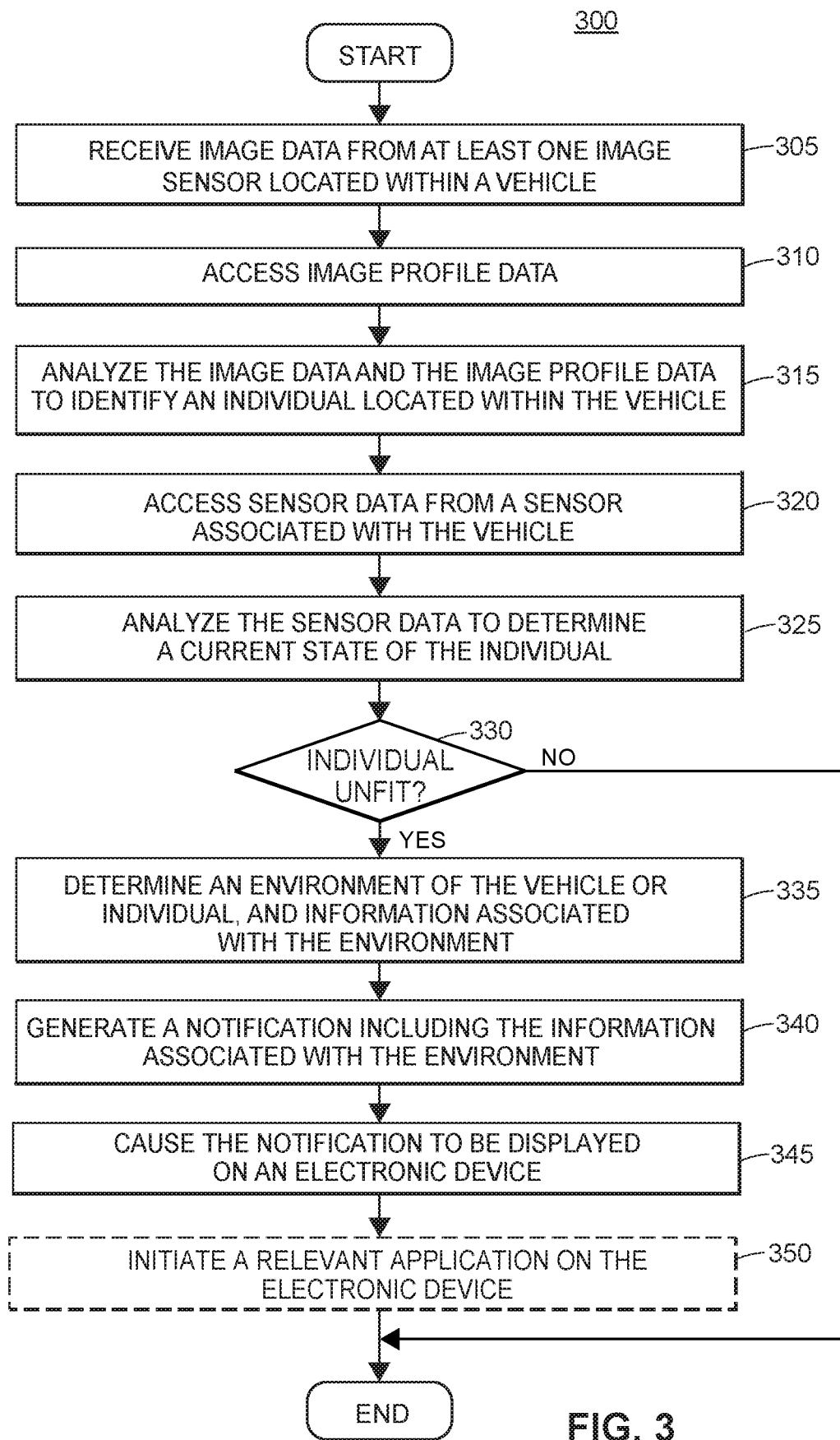
FIG. 3 depicts an exemplary flow diagram associated with analyzing various data to improve vehicle safety, in accordance with some embodiments.

FIG. 3 depicts is a block diagram of an exemplary method 300 of improving safety of a vehicle. The method 300 may be facilitated by an electronic device that may be located within a vehicle or incorporated as part of the vehicle. The electronic device may support execution of one or more dedicated applications that may facilitate the functionalities of the method 300. Further, the electronic device may enable a user or individual (e.g., an individual attempting to operate the vehicle) to make various selections and facilitate various functionalities.

The method 300 may begin when the electronic device receives (block 305) image data from at least one image sensor located within the vehicle. In embodiments, the image sensor may be a component of the electronic device itself or may be external to the electronic device. Further, the image data may be received in real-time or near real-time as the at least one image sensor captures the image data. After receiving the image data, the electronic device may access (block 310) image profile data associated with a set of individuals. In some embodiments, the set of individuals may be registered to or otherwise associated with the vehicle. Further, the image profile data may indicate physical characteristics (e.g., facial features) of the corresponding set of individuals.

The electronic device may analyze (block 315) the image data and the image profile data to identify an individual located within the vehicle who is depicted in the image data. In one implementation, the electronic device may perform a facial recognition analysis using the image data and the image profile data. It should be appreciated that alternate or additional analyses, techniques, calculations, algorithms, or the like are envisioned. In some embodiments, the electronic device may not have enough relevant data to identify the individual, in which case processing may return to block 305 at which additional image data may be received, or processing may end or proceed to other functionality.

The electronic device may further access (block 320) sensor data from a sensor associated with the vehicle. According to some embodiments, the sensor may be a breathalyzer or similar device configured to detect a BAC reading of the individual, where the sensor may be incorporated into the electronic device or otherwise configured to send sensor data to the electronic device. In other embodiments, the sensor may be an additional image sensor (or one of the at least one image sensors) configured to capture additional image data of the individual. The electronic device may analyze (block 325) the sensor data to determine a current state of the individual. According to embodiments, if the sensor is a breathalyzer or similar device, the current state may correspond to the BAC reading of the individual; or if the sensor is an additional image sensor, the current state may correspond to an alertness or drowsiness level of the individual (e.g., as depicted in the additional image data).

The electronic device may determine (block 330) whether the individual is unfit to operate the vehicle. In making the determination, the electronic device may compare the current state of the individual to one or more threshold values or conditions. For example, if the current state of the individual has an associated BAC reading, the electronic device may determine that the individual is unfit to operate the vehicle if the BAC reading exceeds a certain threshold, thereby indicating that the individual is intoxicated. For further example, if the current state of the individual has one or more indications of drowsiness or lack of alertness, the electronic device may determine that the individual is unfit to operate the vehicle if a certain amount of the indications are present in the sensor data.

If the electronic device determines that the individual is not unfit to operate the vehicle ("NO"), processing may end or proceed to other functionality. If the electronic device determines that the individual is unfit to operate the vehicle ("YES"), the electronic device may determine (block 335) an environment of the vehicle or the individual, as well as information associated with the environment. According to some embodiments, the electronic device may interface with a location module to identify a current location of the individual/electronic device, and/or may interface with a clock to identify a current time and/or stored location data. Further, the electronic device may determine at least one lodging establishment and/or at least one alternative mode of transportation in a vicinity of or otherwise nearby the current location of the individual/electronic device. In another implementation, the electronic device may determine, based on the current time and/or the stored location data, an establishment (e.g., a bar) in which the individual/electronic device was recently located. In a further implementation, the electronic device may identify a contact stored on the electronic device, such as a favorite contact or recent contact of the individual.

The electronic device may generate (block 340) a notification including the information associated with the environment. In particular, the notification may include any identified lodging establishment or alternative mode of transportation. In other embodiment, the electronic device may identify a contact that is stored on the electronic device as well as contact information for the contact, where the notification may include the contact information. The electronic device may cause (block 345) the notification to be displayed on the electronic device, such as via a user interface. In particular, the notification may be in the form of a pop-up notification or other type of alert or communication, and may automatically display on the electronic device or may be manually accessed by the individual. In some embodiments, the individual may access the notification via a dedicated application.

The electronic device may optionally initiate (block 350) a relevant application on the electronic device. In particular, if the notification indicates a lodging establishment, the electronic device may initiate a booking application installed on the electronic device, which may determine whether there is any availability at the lodging establishment and may facilitate booking a stay at the lodging establishment. In another implementation, if the notification indicates an alternative mode of transportation, the electronic device may initiate a transportation network application installed on the electronic device, and may request the alternative mode of transportation via the transportation network application. In a further implementation, if the notification indicates a contact of the individual, the electronic device may initiate a messaging or dialer application installed on the electronic device, to initiate a communication to the contact. It should be appreciated that the electronic device may enable the individual to manually make selections within the initiated application, or may automatically facilitate the various functionalities of the initiated application. Further, it should be appreciated that the notification may indicate whether an alternative mode of transportation or lodging establishment has been booked or requested, or whether a communication has been sent to a contact.

Figure 4B:
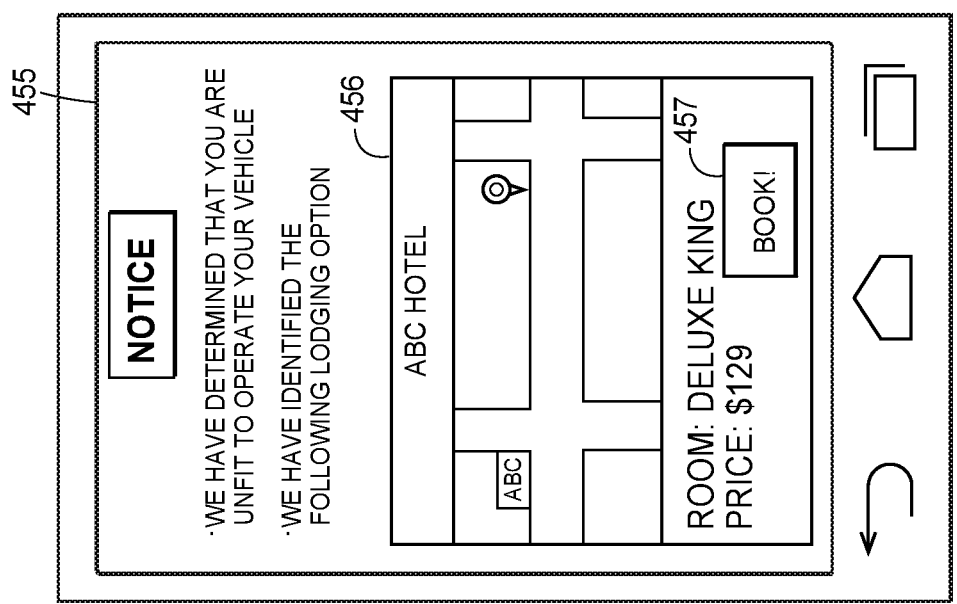
FIGS. 4A and 4B depict exemplary user interfaces associated with generated notifications to improve vehicle safety, in accordance with some embodiments.
Figure 4A:
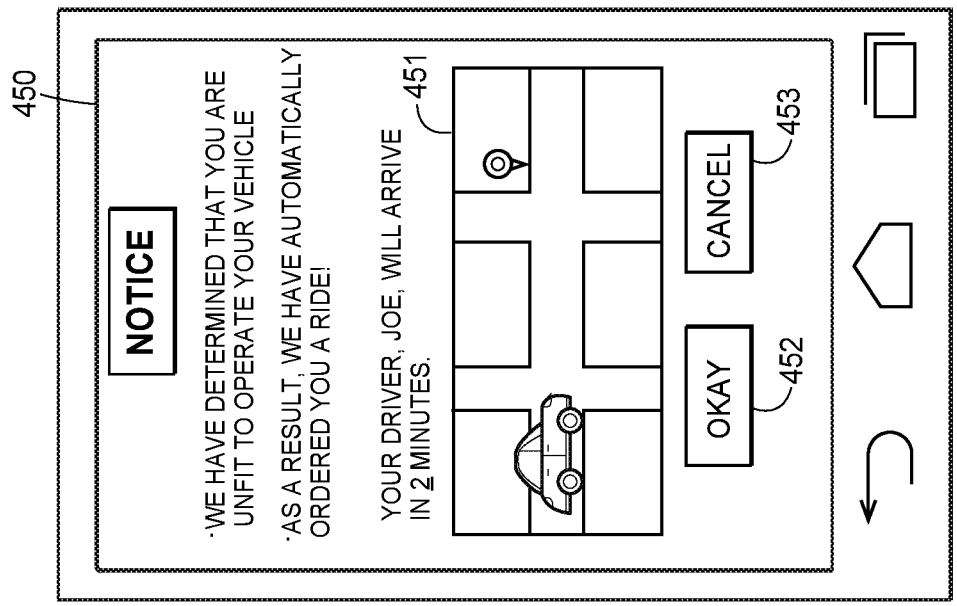

FIGS. 4A and 4B illustrate exemplary interfaces associated with determining and displaying information associated with options alternative to operating a vehicle. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 indicating a situation in which an individual is deemed unfit to operate a vehicle. The interface 450 indicates an option 451 for an alternative mode of transportation. As shown in FIG. 4A, the alternative mode of transportation is a taxi, where the option 451 indicates a real-time status of the taxi, namely, that the driver (Joe) will arrive in two (2) minutes. The interface 450 may also include a "CANCEL" selection 453 that enables an accessing user to select to dismiss the interface 450 (or, in some cases, to cancel the taxi) and an "OKAY" selection 452 that enables an accessing user to proceed to other functionality.

FIG. 4B illustrates an additional interface 455 indicating another situation in which an individual is deemed unfit to operate a vehicle. The interface 455 indicates information 456 associated with an available lodging option near a location of the electronic device. As shown in FIG. 4B, the available lodging option is ABC Hotel, where the information 456 indicates a location of ABC Hotel relative to the location of the electronic device. The interface 456 may also include a "BOOK!" selection 457 that enables an accessing user to select to book a room at ABC Hotel.

Figure 5:
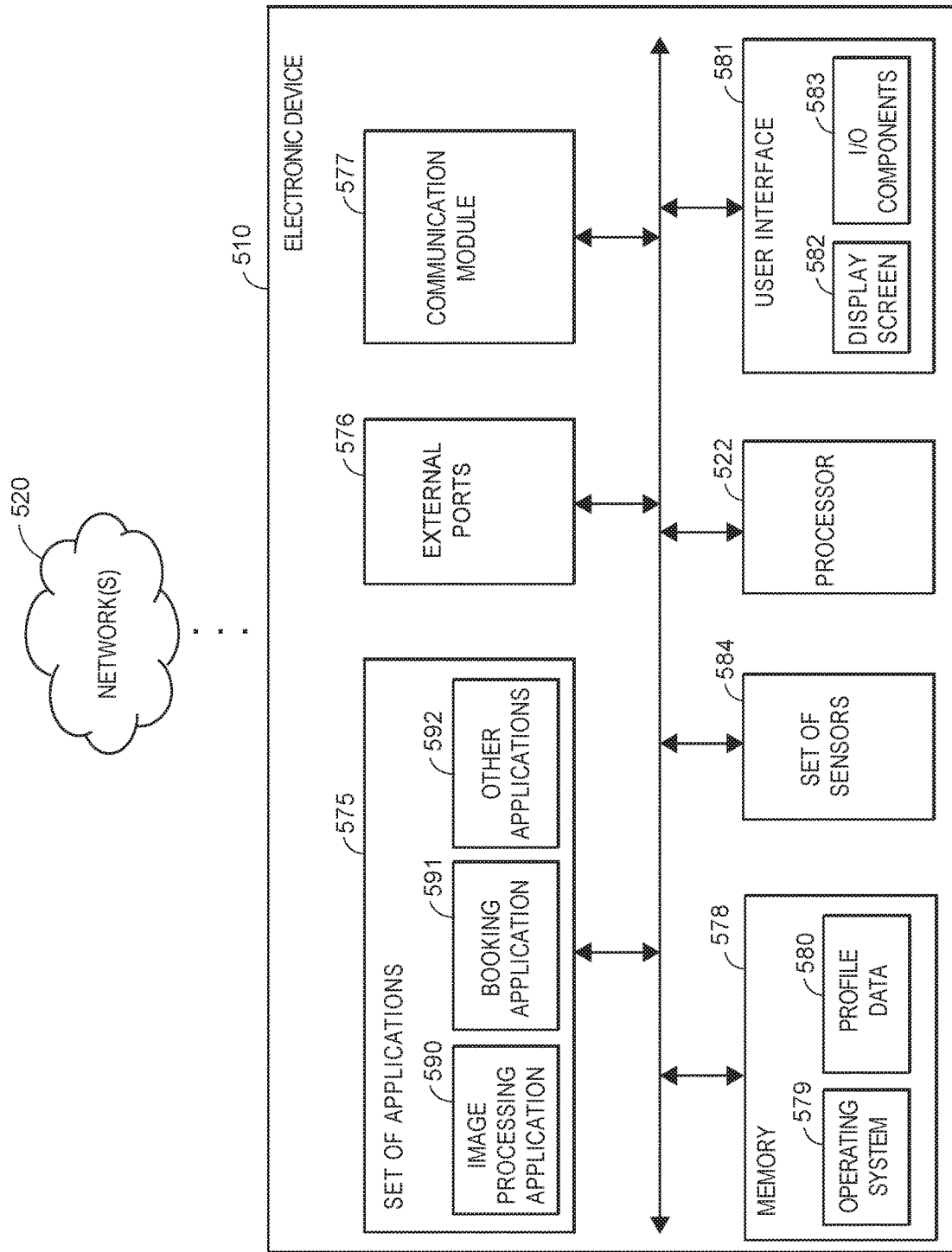
FIG. 5 is a block diagram of an exemplary electronic device, in accordance with some embodiments.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify individuals depicted in the image data, and booking application 591 configured to request or book a lodging establishment, an alternative mode of transportation, or the like. It should be appreciated that one or more other applications 592 are envisioned, such as an application configured to determine various environmeental information.

The processor 522 may interface with the memory 578 to execute the operating system 579 and the set of applications 575. According to some embodiments, the memory 578 may also include profile data 580 that may include data associated with a set of individuals associated with a vehicle. In some implementations, the image processing application 590 may interface with the profile data 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote server via the network 520.

The electronic device 510 may further include a set of sensors 584. The processor 522 and the set of applications 575 may interface with the set of sensors 584 to retrieve and process the corresponding sensor data. The set of sensors 584 may include, for example, a location module, an accelerometer, a gyroscope, a compass, a weather sensors, one or more image sensors, and/or the like. In one particular implementation, a log generation application may use various data from the set of sensors 584 to generate vehicle operation logs.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of improving operation of an autonomous vehicle, the method comprising:
   receiving, by a computer processor, user profile data, wherein the user profile data includes physical characteristics of a set of users;
   receiving image data from at least one image sensor located within the vehicle in response to detecting an individual sitting in a seat within the autonomous vehicle;
   analyzing, by the computer processor, the image data to identify a particular individual located within the vehicle based on a comparison of the image data with the user profile data;
   accessing (i) sensor data from a sensor associated with the vehicle, and (ii) a location history of an electronic device associated with the particular individual;
   analyzing the sensor data to determine a current state of the particular individual;
   in response to analyzing the sensor data, generating an autonomous mode control signal;
   altering an autonomous operation mode of the vehicle based on the autonomous mode control signal; and
   in response to the determined current state of the particular individual and the location history of the electronic device, automatically performing at least one function based on the user profile data for the particular individual, the performing including initiating at least one of a booking application or a transportation network application installed on the electronic device associated with the particular individual.

2. The computer-implemented method of claim 1, wherein accessing the sensor data from the sensor comprises:
   receiving a reading from a breathalyzer device used by the particular individual, the reading indicating a blood alcohol content of the particular individual;
   wherein analyzing the sensor data to determine the current state of the particular individual comprises:
   determining, based on the blood alcohol content of the particular individual, that the particular individual is intoxicated.

3. The computer-implemented method of claim 1, further comprising:
   determining an environment of the vehicle or the particular individual; and determining information associated with the environment of the vehicle or the particular individual.

4. The computer-implemented method of claim 3, wherein determining the environment of the vehicle or the particular individual comprises:
identifying, using a location module of the electronic device, a current location of the electronic device;
and wherein determining the information associated with the environment of the vehicle or the particular individual comprises:
identifying, based on the current location of the electronic device, a lodging establishment near the current location of the electronic device.

5. The computer-implemented method of claim 4, wherein:
the initiating includes initiating the booking application; and
identifying, based on the current location of the electronic device, the lodging establishment comprises:
determining, via the booking application, that there is availability at the lodging establishment.

6. The computer-implemented method of claim 3, wherein determining the environment of the vehicle or the particular individual comprises:
identifying, using a location module of the electronic device, a current location of the electronic device; and
wherein determining the information associated with the environment of the vehicle or the particular individual comprises:
identifying, based on the current location of the electronic device, an alternative mode of transportation.

7. The computer-implemented method of claim 6, wherein:
the initiating includes initiating the transportation network application; and
identifying, based on the current location of the electronic device, the alternative mode of transportation comprises:
requesting the alternative mode of transportation via the transportation network application.

8. The computer-implemented method of claim 3, wherein determining the environment of the vehicle or the particular individual comprises:
identifying a current time; and
identifying, based on the location history of the electronic device, an establishment in which the electronic device was recently located.

9. The computer-implemented method of claim 3, further comprising:
generating a notification including the information associated with the environment of the vehicle or the particular individual, the generating comprising:
identifying (i) a contact of the particular individual stored on the electronic device and (ii) contact information of the contact; and
generating the notification including the contact information of the contact.

10. The computer-implemented method of claim 9, wherein identifying the contact of the particular individual stored on the electronic device comprises:
identifying the contact as at least one of: (i) a recently-contacted contact and (ii) a frequently-contacted contact.

11. A system for improving operation of an autonomous vehicle, comprising:
a user interface;
a memory configured to store non-transitory computer executable instructions; and
a processor configured to interface with the memory, wherein the processor is configured to execute the non-transitory computer executable instructions to cause the processor to:
receive user profile data, wherein the user profile data includes physical characteristics of a set of users;
receive image data from at least one image sensor located within the vehicle in response to detecting an individual sitting in a seat within the autonomous vehicle,
analyze the image data to identify a particular individual located within the vehicle based on a comparison of the image data with the user profile data,
access (i) sensor data from a sensor associated with the vehicle, and (ii) a location history of an electronic device associated with the particular individual,
analyze the sensor data to determine a current state of the particular individual,
in response to analyzing the sensor data, generate an autonomous operation mode control signal,
alter an autonomous operation mode of the vehicle based on the autonomous operation mode control signal, and
in response to the determined current state of the particular individual and the location history of the electronic device, automatically perform at least one function based on the user profile data for the particular individual, the at least one function including initiating at least one of a booking application or a transportation network application installed on the electronic device associated with the particular individual.

12. The system of claim 11, wherein to access the sensor data from the sensor, the processor is configured to:
receive a reading from a breathalyzer device used by the particular individual, the reading indicating a blood alcohol content of the particular individual,
and wherein to analyze the sensor data to determine the current state of the particular individual, the processor is configured to:
determine, based on the blood alcohol content of the particular individual, that the particular individual is intoxicated.

13. The system of claim 11, wherein the processor is further configured to:
determine environment of the vehicle or the particular individual, and
determine information associated with the environment of the vehicle or the particular individual.

14. The system of claim 13, further comprising:
a location module configured to identify a current location of the electronic device;
wherein to determine the information associated with the environment of the vehicle or the particular individual, the processor is configured to:
identify, based on the current location of the electronic device, a lodging establishment near the current location of the electronic device.

15. The system of claim 14, wherein:
the at least one function includes initiating the booking application; and
to identify, based on the current location of the electronic device, the lodging establishment, the processor is configured to:

determine, via the booking application, that there is availability at the lodging establishment.

16. The system of claim 13, further comprising:
a location module configured to identify a current location of the electronic device;
wherein to determine the information associated with the environment of the vehicle or the particular individual, the processor is configured to:
identify, based on the current location of the electronic device, an alternative mode of transportation.

17. The system of claim 16, wherein:
the at least one function includes initiating the transportation network application; and
to identify, based on the current location of the electronic device, the alternative mode of transportation, the processor is configured to:
request the alternative mode of transportation via the transportation network application.

18. The system of claim 13, wherein to determine the environment of the vehicle or the particular individual, the processor is configured to:
identify a current time, and
identify, based on the location history of the electronic device, an establishment in which the electronic device was recently located.

19. The system of claim 13, wherein the processor is further configured to generate a notification including the information associated with the environment of the vehicle or the particular individual, wherein, to generate the notification, the processor is configured to:
identify (i) a contact of the particular individual stored on the electronic device and (ii) contact information of the contact, and
generate the notification including the contact information of the contact.

20. The system of claim 19, wherein to identify the contact of the particular individual stored on the electronic device, the processor is configured to:
identify the contact as at least one of: (i) a recently-contacted contact and (ii) a frequently-contacted contact.

21. An electronic device for improving operation of an autonomous vehicle, comprising:
a user interface;
a memory configured to store non-transitory computer executable instructions; and
a processor configured to interface with the memory, wherein the processor is configured to execute the non-transitory computer executable instructions to cause the processor to:
receive user profile data, wherein the user profile data includes physical characteristics of a set of users;
receive image data from at least one image sensor located within the vehicle in response to detecting an individual sitting in a seat within the autonomous vehicle,
analyze the image data to identify a particular individual located within the vehicle based on a comparison of the image data with the user profile data,
access (i) sensor data from a sensor associated with the vehicle, and (ii) a location history of the electronic device,
analyze the sensor data to determine a current state of the particular individual,
in response to analyzing the sensor data, generate an autonomous operation mode control signal,
alter an autonomous operation mode of the vehicle based on the autonomous operation mode control signal, and
in response to the determined current state of the particular individual and the location history of the electronic device, automatically perform at least one function based on the user profile data for the particular individual, the at least one function including initiating at least one of a booking application or a transportation network application installed on the electronic device.

22. The device of claim 21, wherein to access the sensor data from the sensor, the processor is configured to:
receive a reading from a breathalyzer device used by the particular individual, the reading indicating a blood alcohol content of the particular individual, and wherein to analyze the sensor data to determine the current state of the particular individual, the processor is configured to:
determine, based on the blood alcohol content of the particular individual, that the particular individual is intoxicated.

* * * * *